United States Patent
Lnu et al.

(10) Patent No.: US 12,237,938 B2
(45) Date of Patent: Feb. 25, 2025

(54) PRIORITIZING MULTICAST STREAMS IN INTERNET GROUP MANAGEMENT PROTOCOL (IGMP) NETWORKS

(71) Applicant: Ciena Corporation, Hanover, MD (US)

(72) Inventors: Priyanshu Lnu, Meerut (IN); Ashutosh Aggarwal, New Delhi (IN)

(73) Assignee: Ciena Corporation, Hanover, MD (US)

( * ) Notice: Subject to any disclaimer, the term of this patent is extended or adjusted under 35 U.S.C. 154(b) by 323 days.

(21) Appl. No.: 18/089,292

(22) Filed: Dec. 27, 2022

(65) Prior Publication Data
US 2024/0163127 A1    May 16, 2024

(30) Foreign Application Priority Data
Nov. 10, 2022   (IN) .............................. 202211064323

(51) Int. Cl.
*H04L 12/18*    (2006.01)
*H04L 12/46*    (2006.01)

(52) U.S. Cl.
CPC ........ *H04L 12/185* (2013.01); *H04L 12/1881* (2013.01); *H04L 12/4641* (2013.01)

(58) Field of Classification Search
CPC .................................................... H04L 12/185
USPC ......................................................... 370/390
See application file for complete search history.

(56) References Cited

U.S. PATENT DOCUMENTS

| | | | |
|---|---|---|---|
| 7,590,054 B1 | 9/2009 | Holness et al. | |
| 7,792,044 B2 | 9/2010 | Holness et al. | |
| 8,295,175 B2 | 10/2012 | Ellis et al. | |
| 8,509,061 B2 | 8/2013 | Holness et al. | |
| 8,553,697 B2 | 10/2013 | Allan et al. | |
| 8,588,060 B2 | 11/2013 | Holness | |
| 8,687,633 B2 | 4/2014 | Rabie et al. | |
| 8,737,198 B1 | 5/2014 | Holness et al. | |
| 8,855,122 B2 | 10/2014 | Bottorff et al. | |
| 8,953,456 B2 | 2/2015 | Mohan et al. | |
| 9,025,435 B2 | 5/2015 | Holness et al. | |
| 9,075,717 B2 | 7/2015 | Mohan, Jr. et al. | |
| 9,106,573 B2 | 8/2015 | Martin et al. | |
| 9,160,563 B2 | 10/2015 | Ryoo et al. | |
| 9,203,549 B2 | 12/2015 | Holness et al. | |
| 9,319,268 B2 | 4/2016 | Allan et al. | |
| 9,401,817 B2 | 7/2016 | Holness et al. | |
| 9,781,048 B2 | 10/2017 | Holness et al. | |

(Continued)

FOREIGN PATENT DOCUMENTS

CA            2748703 C     7/2010
EP            2 417 735 B1  6/2017

(Continued)

*Primary Examiner* — Sibte H Bukhari
(74) *Attorney, Agent, or Firm* — Baratta Law PLLC; Lawrence A. Baratta, Jr.

(57) ABSTRACT

Systems and methods for prioritizing multicast streams in an Internet Group Management Protocol (IGMP) network are provided. According to one implementation, a process, which may be executed by a router, is configured, in response to a reboot scenario, to query a plurality of hosts regarding membership in a plurality of IGMP multicast streams according to predefined priority levels. The process is further configured to receive membership reports from the plurality of hosts. Also, the process is configured to request a server to restart the IGMP multicast streams according to the predefined priority levels.

20 Claims, 14 Drawing Sheets

(56) References Cited

U.S. PATENT DOCUMENTS

| | | |
|---|---|---|
| 9,843,439 B2 | 12/2017 | Rivaud et al. |
| 9,893,937 B2 | 2/2018 | Holness et al. |
| 10,015,066 B2 | 7/2018 | Mishra et al. |
| 10,122,619 B2 | 11/2018 | Holness et al. |
| 10,425,153 B2 | 9/2019 | Holness et al. |
| 10,623,293 B2 | 4/2020 | Hu et al. |
| 10,721,139 B2 | 7/2020 | Holness et al. |
| 10,785,100 B2 | 9/2020 | Holness |
| 11,171,853 B2 | 11/2021 | Holness et al. |
| 11,206,197 B2 | 12/2021 | Holness |
| 2005/0099949 A1 | 5/2005 | Mohan et al. |
| 2005/0099951 A1 | 5/2005 | Mohan et al. |
| 2005/0099954 A1 | 5/2005 | Mohan et al. |
| 2005/0099955 A1 | 5/2005 | Mohan et al. |
| 2007/0268817 A1 | 11/2007 | Smallegange et al. |
| 2010/0135291 A1 | 6/2010 | Martin et al. |
| 2016/0352624 A1 | 12/2016 | Mishra et al. |
| 2018/0102944 A1 | 4/2018 | Mishra et al. |
| 2018/0183615 A1* | 6/2018 | Stephan .................. H04L 69/14 |
| 2020/0053023 A1* | 2/2020 | Haag .................. H04L 12/5601 |

FOREIGN PATENT DOCUMENTS

| | | |
|---|---|---|
| EP | 2 430 798 B1 | 8/2018 |
| EP | 3 097 659 B1 | 3/2021 |
| WO | 2005069540 A1 | 7/2005 |
| WO | 2010130027 A1 | 11/2010 |
| WO | 2021025826 A1 | 11/2021 |

* cited by examiner

PRIORITIZING MULTICAST STREAMS IN INTERNET GROUP MANAGEMENT PROTOCOL (IGMP) NETWORKS

TECHNICAL FIELD

The present disclosure generally relates to networking systems and methods. More particularly, the present disclosure relates to the Internet Group Management Protocol (IGMP) and prioritizing multicast streams in an IGMP environment.

BACKGROUND

Request for Comments 1112 (RFC 1112) essentially describes Internet Protocol (IP) multicasting, which includes the transmission of multicast datagrams to host groups. A host group may usually be defined as a set of one or more host devices or member devices (e.g., end-user computers, IP televisions (IPTVs), video streaming devices, gaming devices, etc.), where each host device has requested to join the host group in order to receive specific multicast streams from a router. Also, membership in a host group is dynamic. That is, hosts may send a "join" message at any time to join the membership or send a "leave" message at any time to leave the membership. Furthermore, each host device may have membership in any number of groups (or no groups at all). In addition to RFC 1112, other RFCs (e.g., RFC 2236, RFC 3376, RFC 4607, RFC-4608, etc.) describe IP multicasting, the Internet Group Management Protocol (IGMP), and the like.

Typically, an IGMP router may be configured to control multicasting to a plurality of hosts. Communication between the IGMP router and host devices may usually involve an intermediate IGMP snooping device. In some cases, the IGMP router may be configured as a querier device that queries the host devices, via the IGMP snooping device, to determine the membership status of each host device. Then, the IGMP querier (or router) can deliver multicast streams from a server to the respective host groups.

However, there is currently no mechanism for the IGMP querier (or router) and/or IGMP snooping device to prioritize the various multicast streams. Thus, when there is a system reboot (or restart), a session stabilization to recover the system does not restart the plurality of different multicast streams in any particular order. As such, there is therefore an issue with this arbitrary reboot procedure in conventional IGMP multicasting systems. The un-prioritized multicast streams may add an undesired delay due to the absence of a predetermined IGMP querier configuration strategy for re-entering configuration data into the hardware of the IGMP querier device. This issue may also be exacerbated by the scaling of a Virtual Local Area Network (VLAN). For example, since hardware resources are limited within the IGMP querier device of a VLAN, multiple memberships (or subscriptions) to the plurality of multicast streams may result in the dropping of multicast streams that may be considered to have a higher priority. However, without the capability to define priorities in the conventional systems, important multicast streams may suffer.

Another issue with conventional systems is that the IGMP snooping device may observe prolonged flooding after a reboot or restart event until the configuration data is entered in the hardware. This may result in higher bandwidth consumption and may threaten network information security (e.g., Denial of Service (DoS), Distributed DoS (DDoS), etc.) for important streams. These issues may have a greater impact in the case of a scaled setup where there are dozens or hundreds of IGMP querier interfaces and corresponding Forwarding Domains (FDs) or host groups communicating streams with the assistance of the one or more IGMP snooping devices.

Thus, upon observation of the conventional IGMP systems, it has also been discovered that there is a delayed session stabilization between the hosts and the IGMP querier device, a higher bandwidth consumption, and unnecessary flooding of multicast traffic after a system restart or reboot. After reboot, the re-entry of IGMP querier device interface configurations, FDs, multicast groups, and host groups would normally take place according to an arbitrary configuration order. Therefore, since this behavior may sometimes lead to undesired results and conditions, there is a need with respect to IP multicasting and IGMP to establish systems and methods, as described in the present disclosure, to overcome the deficiencies of the conventional systems and allow for prioritization based on the importance of different service classes of multicast streams.

BRIEF SUMMARY

The present disclosure is directed to systems and methods for prioritizing multicast streams in an IGMP environment. In response to a reboot scenario, a process, according to one implementation, includes the step of querying a plurality of hosts regarding membership in a plurality of IGMP multicast streams according to predefined priority levels. Next, the process includes the step of receiving membership reports from the plurality of hosts. The process also includes the step of requesting a server to restart the IGMP multicast streams according to the predefined priority levels.

According to some embodiments, the process may be implemented by a router that is configured to act as an IGMP querier device. The reboot scenario may include a) a reboot of the router itself, b) a reboot of a Layer 2 (L2) switch acting as an IGMP snooping device in the IGMP environment, and c) a reboot of a VLAN defining the IGMP environment. Each of the IGMP multicast streams may include one of a static stream and a dynamic stream. The predefined priority levels may be entered as service class priorities by a user, such as a network operator. Note, while the various descriptions are described with reference to a router, those skilled in the art will recognize the router can also be a layer 2 switch instead. That is, the term router is used to represent any network element including a layer 2 switch.

Furthermore, the process may also include the step of recording the predefined priority levels of the IGMP multicast streams in a plurality of databases before detecting for the reboot scenario. The process may further include the step of utilizing data entries in the plurality of databases to recreate configuration information in hardware of the router/layer 2 switch. The step of recreating the configuration information in the hardware of the router may be adapted to provide session stabilization after the reboot scenario. The plurality of databases may include a first set of databases associated with prioritization on an IGMP querier device level, a second set of databases associated with prioritization on a multicast group level related to the IGMP querier device, a third set of databases associated with prioritization on a Forwarding Domain (FD) level related to an IGMP snooping device, and a fourth set of databases associated with prioritization on a multicast group level related to the IGMP snooping device. The process may also prioritize the IGMP multicast streams based on the predefined priority levels classifying interfaces of the IGMP querier device and prioritize the IGMP multicast streams based on the predefined priority levels classifying the multicast groups of the interfaces of the IGMP querier device. Furthermore, the process may also prioritize the IGMP multicast streams based on predefined priority levels classifying FDs associated with each of a plurality of IGMP snooping devices and prioritize the IGMP multicast streams based on predefined priority levels classifying multicast groups of each of the FDs.

The step of receiving the membership reports may include receiving one or more messages from one or more hosts to join or leave multicast groups associated with the IGMP multicast streams. The step of requesting the server to restart the IGMP multicast streams according to the predefined priority levels may include prioritizing the IGMP multicast streams to reduce the exposure of higher-priority IGMP multicast streams to Denial of Service (DoS) attacks. The plurality of hosts, for example, may be user devices, Internet Protocol television (IPTV) devices, and/or display devices.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
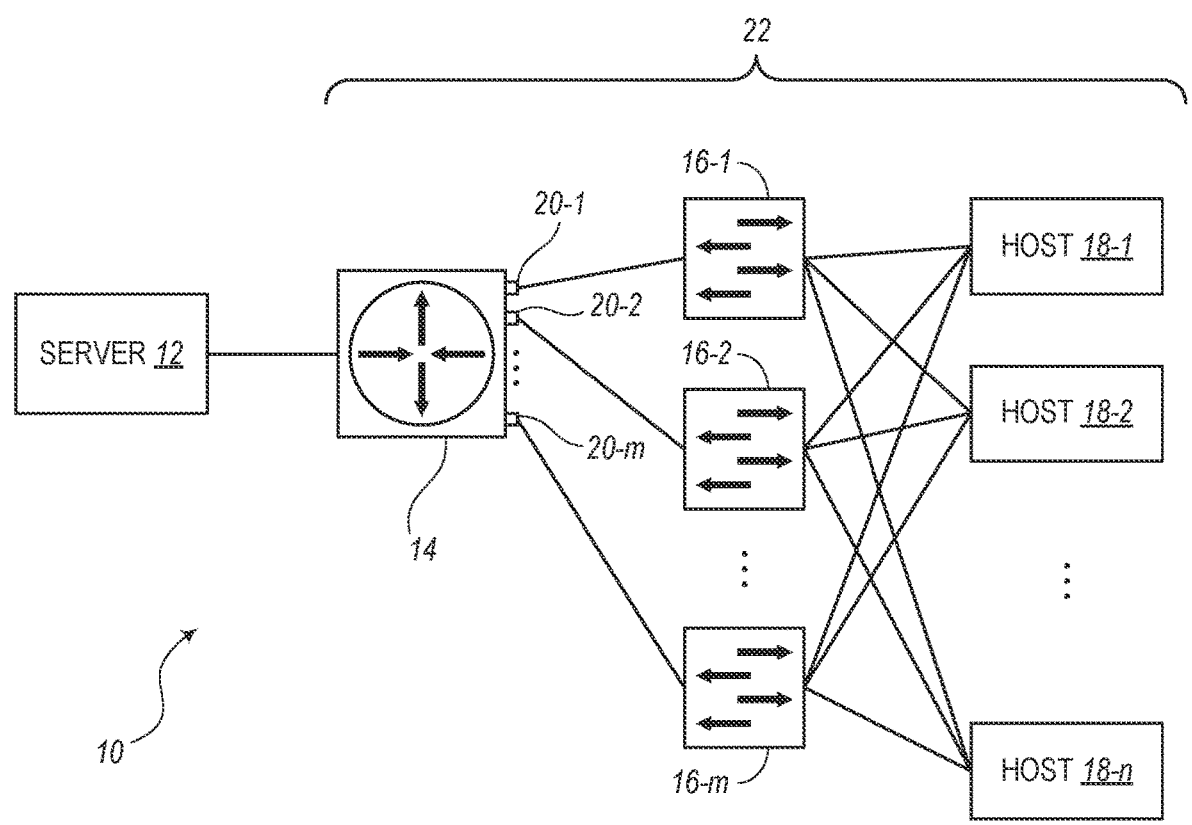
FIG. 1 is a block diagram illustrating an Internet Group Management Protocol (IGMP) network, according to various embodiments.

FIG. 1 is a block diagram illustrating an embodiment of an Internet Group Management Protocol (IGMP) network 10. As shown, the IGMP network 10 includes a server 12, a router 14, one or more switches 16-1, 16-2, . . . , 16-*m* (e.g., Layer 2 (L2) switches), and a plurality of hosts 18-1, 18-2, . . . , 18-*n*. In some embodiments, the IGMP network 10 may include multiple routers 14. The router 14 includes a plurality of interfaces 20-1, 20-2, . . . , 20-*m* configured for communication with each of the respective switches 16-1, 16-2, . . . , 16-*m* to enable multicasting to different switches 16 based on various membership criteria.

The server 12 may be configured as a local server, cloud edge server, etc.; the router 14 may be configured as an IGMP querier device; and the switches 16 may be configured as IGMP snooping devices. In some embodiments, the router 14 may be configured as both an IGMP querier device and an IGMP snooping device. In some embodiments, the router 14, switches 16, and hosts 18 may be part of a Virtual Local Area Network (VLAN) 22 or multiple VLANs (e.g., L2 VLANs).

The protocols defined with respect to IGMP and IP multicasting (e.g., the RFCs described above) may be configured to operate in Layer 3 (L3), such that L2 snooping can be performed in parallel with L3 operation to snoop on L3 IGMP activity. It may be noted that this snooping is not specifically defined by the IGMP protocol.

Figure 2:
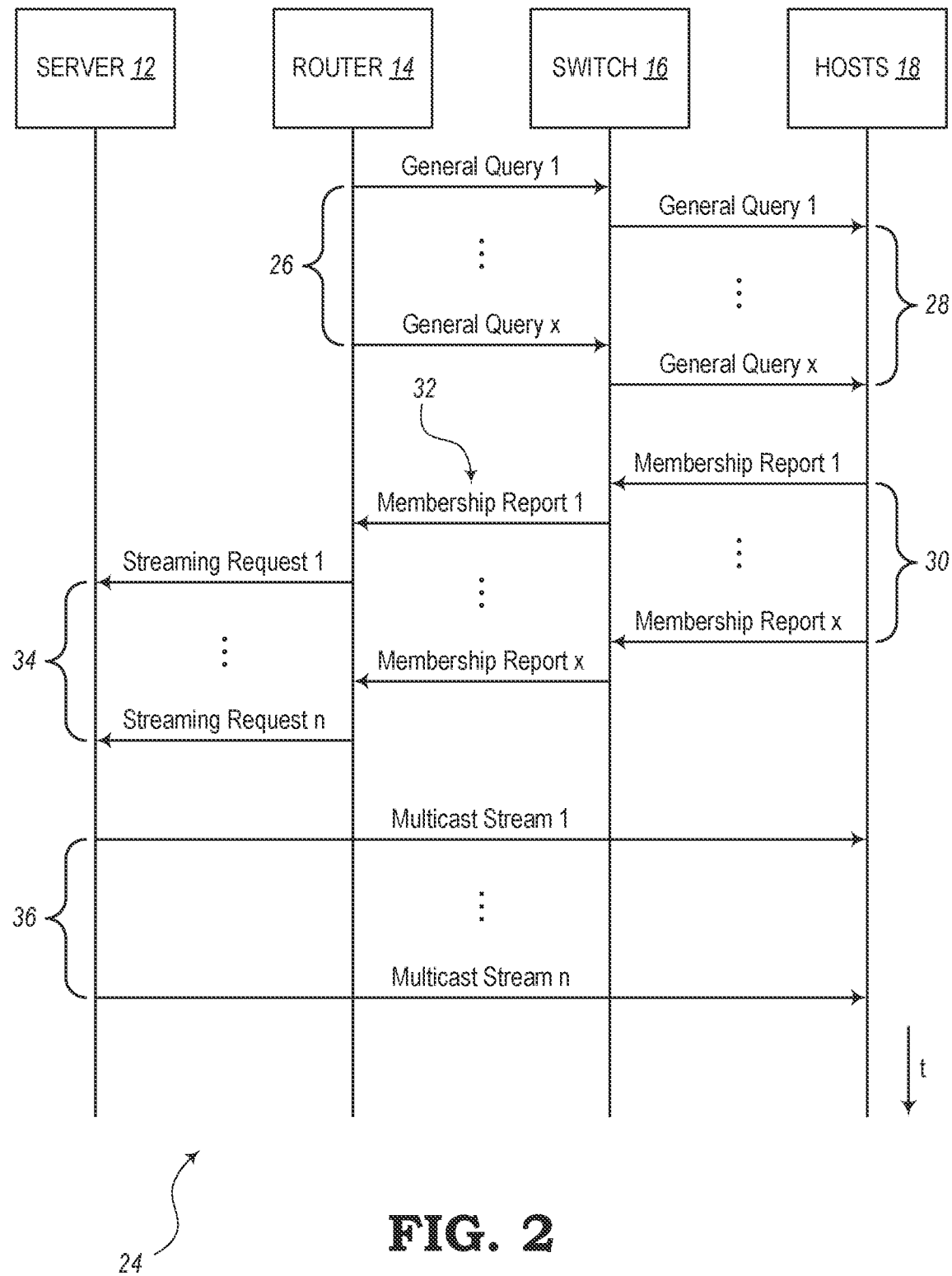
FIG. 2 is a diagram illustrating a timing sequence of data transmissions among the devices of the IGMP network of FIG. 1, according to various embodiments.

FIG. 2 shows an example of a timing sequence 24 in which the transmissions of messages and data throughout the IGMP network 10 are depicted. Upon the occurrence of a reboot (or restart) procedure, the components of the VLAN 22 are configured to exchange messages to re-enter configuration data into hardware or memory of the router 14 and/or switch 16 to enable the system to resume multicast streaming services that had been interrupted by the reboot procedure. That is, the router 14, a corresponding switch 16, and a corresponding set of hosts 18 can share messages to allow the router 14 to determine which hosts 18 are currently members of the FD (or host group) for receiving multicast streams. For example, the reboot procedure may correspond to a restart of the entire VLAN 22, a restart of one or more components (e.g., the router 14, a corresponding switch 16, etc.) of the VLAN 22, a restart of a software package, a restart of a software container, a restart after a node upgrade or firmware download, or a restart of other types of related hardware or software components operating in the VLAN 22.

A first set of messages 26 is sequentially transmitted from the router 14 to the switch 16 as General Query (GQ) IGMP messages. This first set of messages 26 is labelled GQ1, GQ2, . . . , GQx, where x is equal to the number of FDs, and where each FD represents a host group membership for receiving specific multicast streams. It may be noted that GQ1 is transmitted first, followed by GQ2, and so on until all GQs are transmitted to the L2 switch 16. Upon receiving GQ1, GQ2, . . . , GQx, the switch 16 is configured to forward a second set of messages 28, which include the GQ 1, GQ2, . . . , GQx messages, to the hosts 18 to query the hosts 18 as to whether each of the hosts 18 wishes to remain as a member of one or more FDs, if the host 18 wishes to join one or more FDs, and/or if the host 18 wishes to leave one or more FDs.

The hosts 18 then replies to the requests (e.g., second set of messages 28) with a third set of messages 30, which is defined as Membership Report (MR) messages for reporting the membership status of the respective hosts 18. As shown, the x hosts 18 associated with the FD sends MR1, MR2, . . . , MRx, respectively to the switch 16. Thereafter, the switch 16 sends the MR1, MR2, . . . , MRx messages as a fourth set of messages 32 to the router 14. At this point, the router 14 is configured to process the response or MR messages to determine which hosts 18 are members of the various FDs. Then, the router 14 is configured to send request messages as a fifth set of messages 34 to the server 12 to enable the server 12 to continue the process of streaming the multicast data 36 to the hosts 18 according to the updated membership criteria that has be rediscovered following the reboot procedure.

It may be noted from the timing sequence 24 of FIG. 2 that there may be a significant amount of delay from the transmission of the first set of messages 26 to the actual streaming of the multicast data 36. This is the delay that is caused by the order in which the router 14 (querier) starts generating the query. The larger the scale of the VLAN, the greater the delay.

Therefore, the present disclosure is configured to reduce the delay, particular for higher-priority multicast streams. As suggested above, the conventional systems use an arbitrary configuration scheme to order each of the sets of messages 26, 28, 30, 32, 34. Therefore, higher priority queries (e.g., GQs 26, 28), responses (e.g., MRs 30, 32), and requests 34 may be transmitted after lower priority queries, responses, and requests. As such, this may lead to important streams being dropped or delayed beyond an acceptable time lag. The systems and methods of the present disclosure are therefore configured to reorder the messages 26, 28, 30, 32, 34 (e.g., queries, responses, and requests) according to a "predetermined priority." Thus, the present disclosure defines the use of a novel "priority field" that can be used in association with an IGMP environment to prioritize multicast streams, and therefore optimize the timeliness of higher-priority streams.

Again, the conventional systems do not provide any solutions with respect to "prioritizing" multicast streams at the router 14 (e.g., IGMP querier device) and/or switch 16 (e.g., L2 IGMP snooping device). Thus, with un-prioritized streams and no way to enter configuration data in the querier device, the router 14 of the conventional systems may add undesired delay during session stabilization (after a rebooting procedure) for the higher-priority multicast streams. Therefore, as explained in more detail below, the systems and methods of the present disclosure are configured to reorder the GQs 26, 28, MRs 30, 32, and streaming requests 34 to expedite the higher priority streams. Therefore, rather that order the 1 through x messages in an arbitrary manner, the present disclosure describes embodiments in which the messages can be rearranged to provide an order where the highest priority streams are handled first, followed by the next highest priority streams, and so on to the lowest priority streams. Since hardware resources may usually be limited and since a VLAN may include multiple subscription and/or streaming memberships, the router 14 is configured to handle the messages based on priority such that if any "join" messages are dropped, because of insufficient hardware, only the lowest priority messages would be dropped and the higher priority messages would be preserved.

Also, at the switch 16 (e.g., IGMP snooping device), after the reboot/restart procedure, prolonged flooding may be observed, until the hardware entries are complete, which may result in higher bandwidth consumption and may threaten network information security (e.g., Denial of Service (DoS), Distributed DoS (DDoS), etc.) for important streams. These issues may have a greater impact in the case of a scaled setup when there are dozens or hundreds of IGMP querier interfaces 20 and corresponding IGMP snooping devices (e.g., switches 16) enabling multiple FDs.

Figure 3:
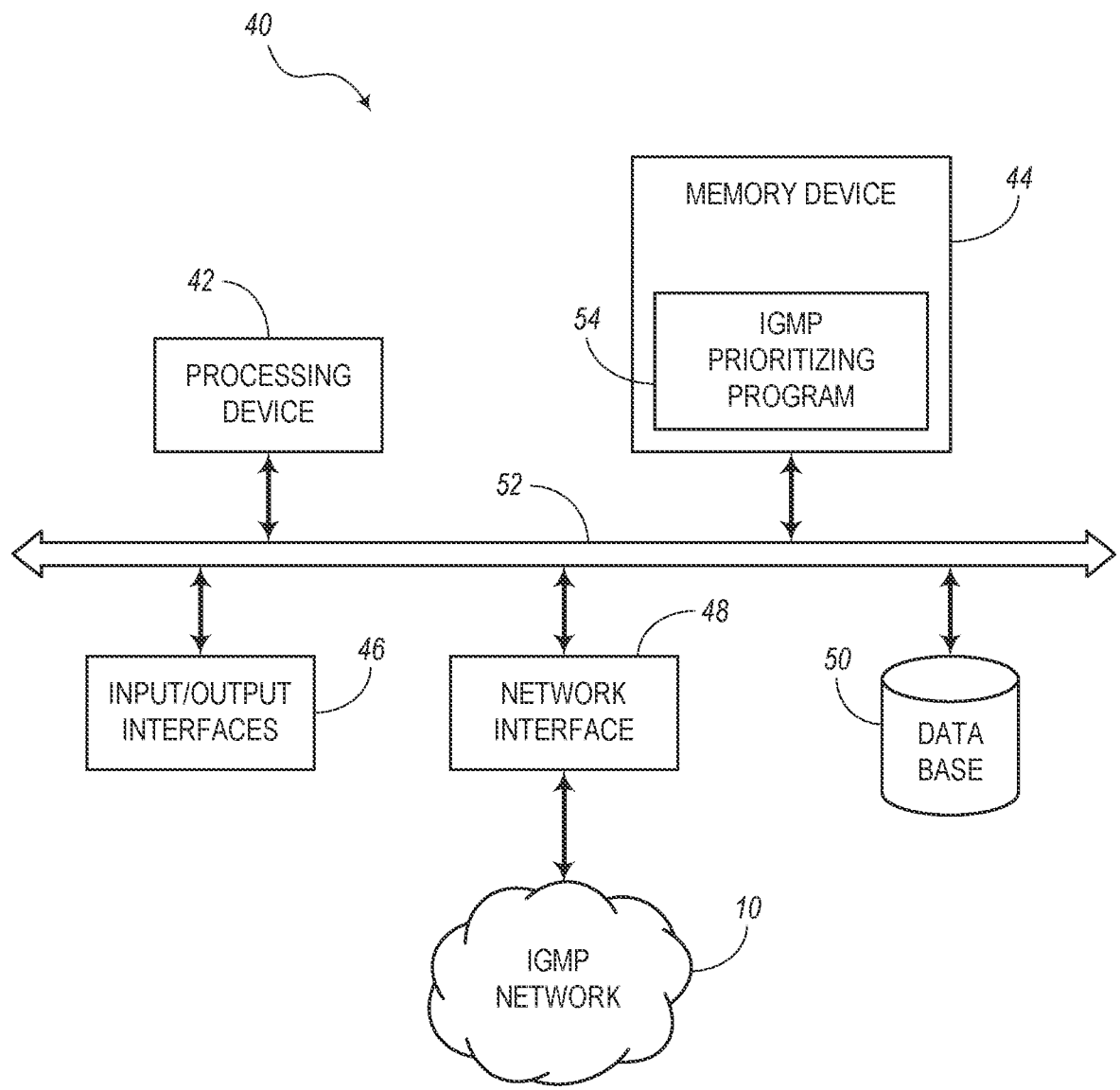
FIG. 3 is a block diagram illustrating a router configured as an IGMP querier device as shown in FIGS. 1 and 2, according to various embodiments.

FIG. 3 is a block diagram illustrating an embodiment of a router 40 (e.g., the router 14) configured as an IGMP querier device, as is described with respect to FIGS. 1 and 2. In the illustrated embodiment, the router 14 may be a digital computing device that generally includes a processing device 42, a memory device 44, Input/Output (I/O) interfaces 46, a network interface 48, and a database 50. It should be appreciated that FIG. 3 depicts the router 40 in a simplified manner, where some embodiments may include additional components and suitably configured processing logic to support known or conventional operating features. The components (i.e., 42, 44, 46, 48, 50) may be communicatively coupled via a local interface 52. The local interface 52 may include, for example, one or more buses or other wired or wireless connections. The local interface 52 may also include controllers, buffers, caches, drivers, repeaters, receivers, among other elements, to enable communication. Further, the local interface 52 may include address, control, and/or data connections to enable appropriate communications among the components 42, 44, 46, 48, 50.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

In some embodiments, the router 14 may include an IGMP prioritizing program 54, which may be implemented in any suitable combination of software and/or firmware in the memory device 44 and/or hardware of the processing device 42. The IGMP prioritizing program 54 may include logic, code, and/or instructions for enabling the processing device 42 to perform various prioritization processes as described in the present disclosure for prioritizing higher classes of multicast streams using any number of classification levels. In particular, the IGMP prioritizing program 54 may be configured to prioritize the VLAN 22 on a number of levels, such as:
  I. IGMP querier interface level;
  II. IGMP querier multicast stream level (based on the interface of level I);
  III. Forwarding Domain (FD) level of the IGMP snooping device; and
  IV. Multicast streaming level (based on the FD of level III).

It may be noted that the first two levels are related to configuring the router 14 (e.g., IGMP querier device) and the last two levels are related to configuring the switch 16 (e.g., IGMP snooping device).

I. Configuring the Interfaces of the IGMP Querier Device

Figure 5:
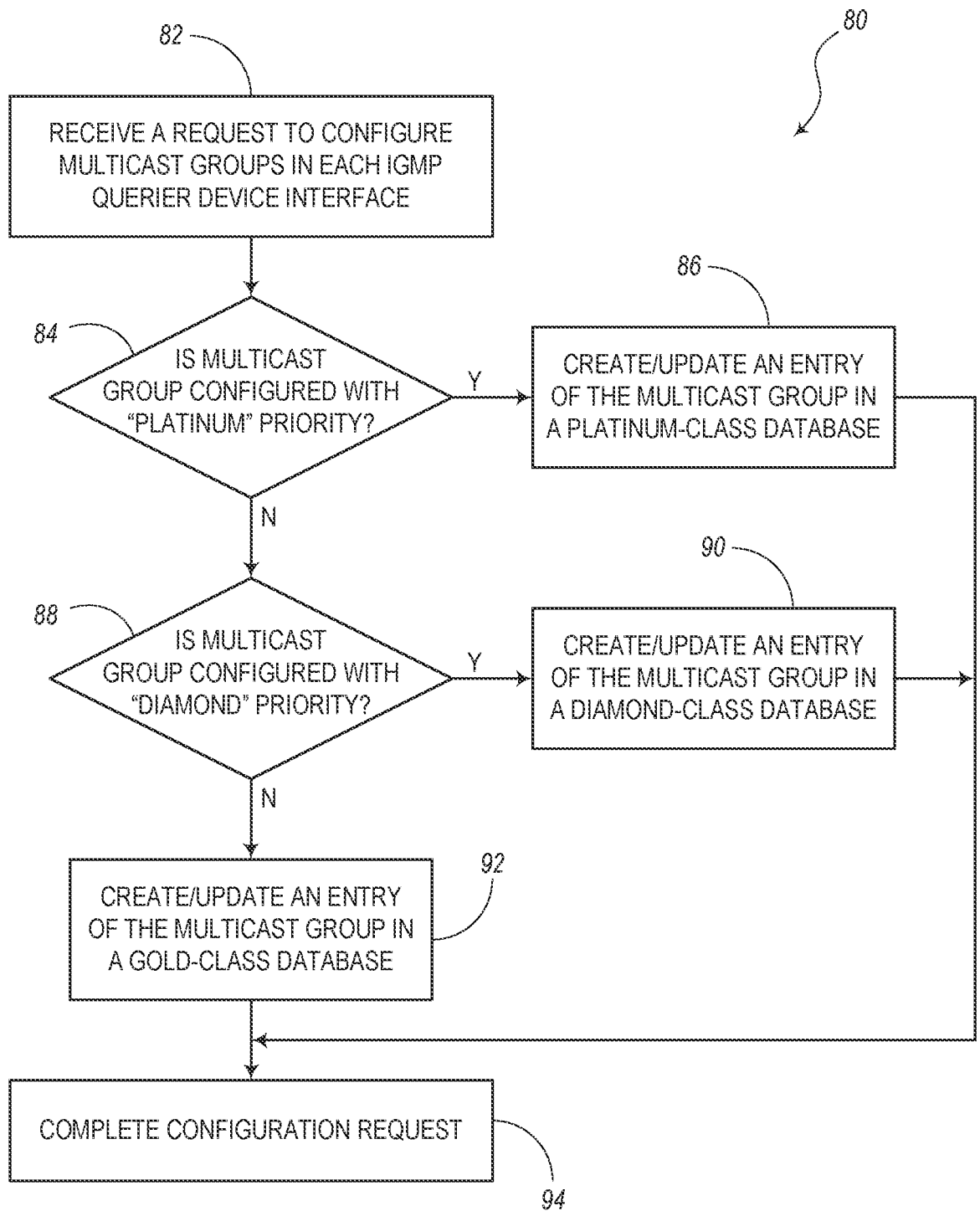
FIG. 5 is a flow diagram illustrating a process for creating a second set of databases to be used to prioritize multicast groups at each of the IGMP querier interfaces as prioritized with respect to the process of FIG. 4, according to various embodiments.

To overcome the problems with the conventional systems, the router 40 provides a solution based on a priority field that allows a user to enter a value per querier interface and per multicast group level (FIG. 5). The below code is an example of sample configuration data for defining three classes of priority (i.e., a "platinum" class, a "diamond" class, and a "gold" class):

---
config# igmp querier instance <instance-name>
interfaces interface <interface-name>
priority
    class-platinum    class-diamond    class-gold
---

Figure 4:
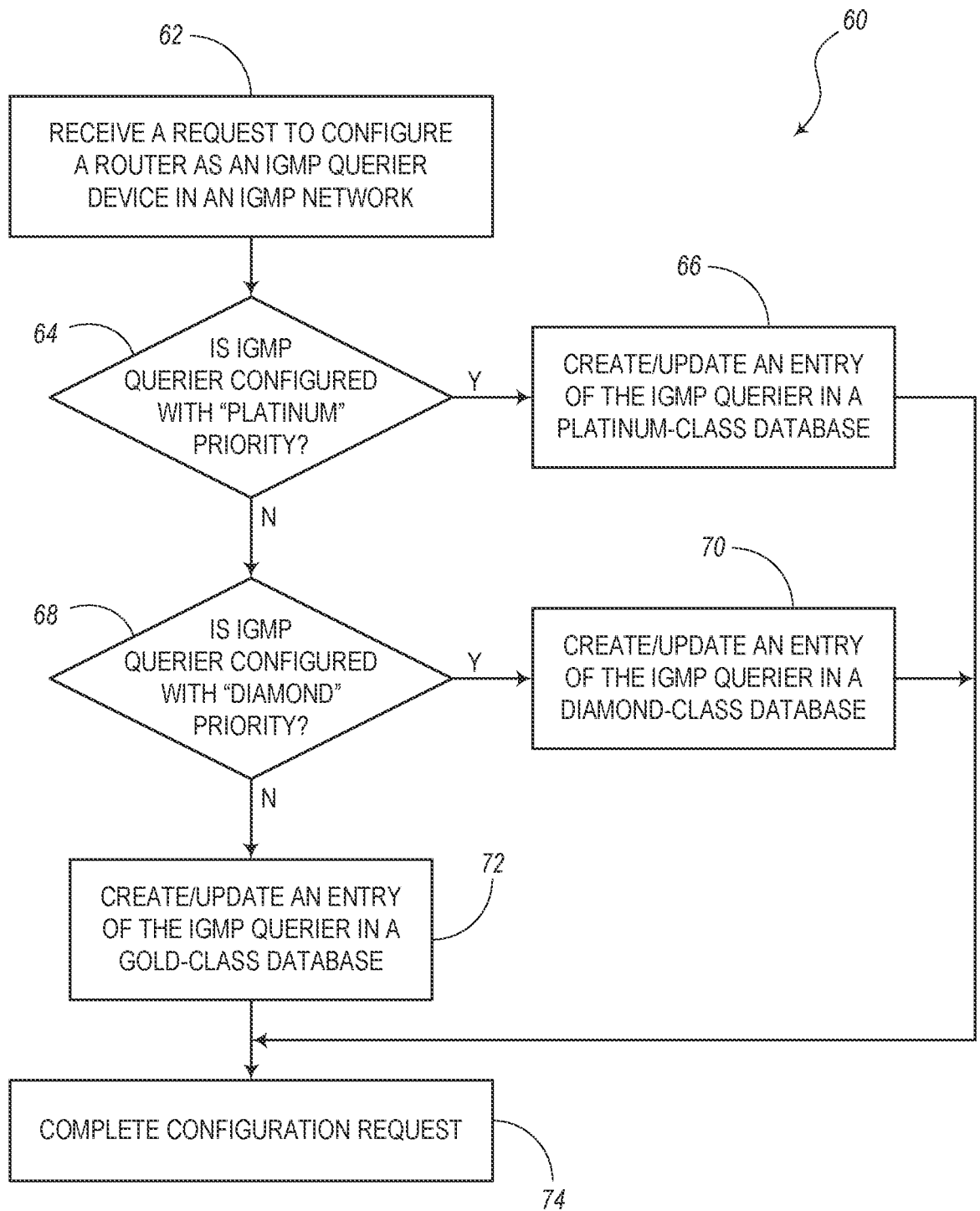
FIG. 4 is a flow diagram illustrating a process for creating a first set of databases to be used to prioritize interfaces of the router of FIG. 3, according to various embodiments.

FIG. 4 is a flow diagram illustrating an embodiment of a process 60 for creating a first set of databases to be used to prioritize the interfaces 20-1, 20-2, . . . , **20-*m* of the router 14 shown in FIG. 1 or interfaces of the router 40 of FIG. 3. The process 60 includes the step of receiving a request to configure a router as an IGMP querier in an IGMP environment, as indicated in block 62. Alternatively, if the router is already configured as an IGMP querier, block 62** may include modifying the router as needed based on a request to do so. The request may be a user request to establish the router in a VLAN as an IGMP querier.

The process 60 further includes determining if the querier is to be configured with the highest level of classification (e.g., "platinum"), as indicated in the condition block 64. If so, the process 60 goes to block 66, which includes the step of creating or updating an entry in a platinum-class database that the querier is to be configured with this priority level, and then the process 60 goes to block 74. If it is determined in condition block 64 that the classification is not platinum, then the process 60 goes to condition block 68, which includes the step of determining if the querier is to be configured with a next highest level of classification (e.g., "diamond"). If so, the process 60 goes to block 70, which includes the step of creating or updating an entry in a diamond-class database that the querier is to be configured with this priority level, and then the process 60 goes to block 74. If it is determined in condition block 68 that the classification is not diamond, then the process 60 goes to block 72, which includes the step of creating or updating an entry in a next highest level of classification (e.g., "gold"), and then the process 60 goes to block 74. As indicated in block 74, the process 60 includes completing the configuration request.

Although the process 60 includes the classifying the queriers or querier interfaces according to three different levels or groups of priority, it should be noted that any number of classification or levels may be used. Also, the classifications or levels may also include any suitable names to distinguish one from another. Furthermore, similar classification names (e.g., platinum, diamond, gold, silver, etc.) may be used in the following examples as well. In some cases, these classifications may be the same and may be stored in the same databases or alternatively may be stored in different sets of databases or stored in different parts of the databases.

II. Configuring Multicast Groups of the IGMP Querier Device

FIG. 5 is a flow diagram illustrating an embodiment of a process 80 for creating a second set of databases to be used to prioritize multicast groups at each of the IGMP querier interfaces, as prioritized with respect to the process 60 of FIG. 4. Therefore, in addition to the querier interface priority process described with respect to FIG. 4, the router 40 can further prioritize the multicast groups on each respective querier interface 20 using a user configurable priority. For example, below is a sample configuration:

---
config# igmp querier instance <instance-name>
interfaces interface <interface-name>
join-multicast-groups multicast-group <group-address>
priority
    class-platinum    class-diamond    class-gold
---

The process 80 includes blocks 82-94 that may be similar to the corresponding blocks 62-74 shown in FIG. 4. However, instead of classifying the IGMP querier (or IGMP querier interfaces), the process 80 is configured to classify the multicast group associated with each of the previous classified IGMP queriers. Again, the databases may include a second set of database or may be the same set as described with respect to FIG. 4. Thus, the process 80 creates multicast group database as shown for querier interface database creation or for updating the databases described above.

Figure 6:
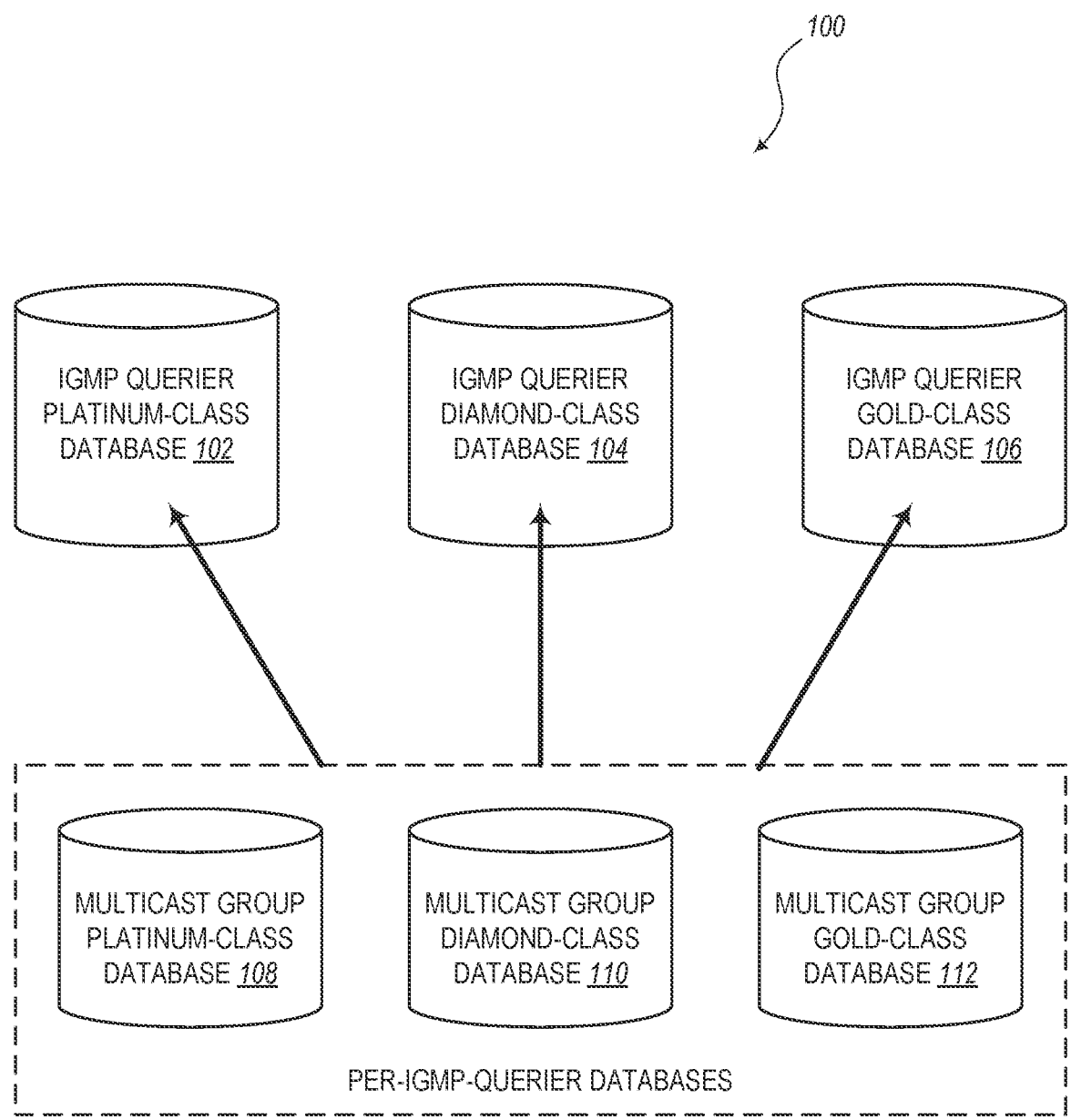
FIG. 6 is a diagram illustrating the first and second sets of databases described with respect to the processes of FIGS. 4 and 5, according to various embodiments.

FIG. 6 is a diagram illustrating an embodiment of a database layout 100 including the first and second sets of databases described with respect to the processes 60 and 80 of FIGS. 4 and 5, respectively. The database layout 100 includes the IGMP querier databases 102, 104, 106, wherein database 102 corresponds to the "platinum-class" database described with respect to block 66 shown in FIG. 4, database 104 corresponds to the "diamond-class" database described with respect to block 70, and database 106 corresponds to the "gold-class" database described with respect to block 72. Each of the databases 102, 104, 106 may each be configured with an additional layer of databases 108, 110, 112, wherein each of the databases 108 corresponds to the "platinum-class" database described with respect to block 86 shown in FIG. 5, database 110 corresponds to the "diamond-class" database described with respect to block 90, and database 112 corresponds to the "gold-class" database described with respect to block 92.

Thus, the processes 60, 80 may be executed at any time before a reboot procedure to establish the priorities of each of the IGMP queriers, querier interfaces, and/or multicast streams. Thereafter, when the system is rebooted, the router 40 may reference the databases 102, 104, 106, 108, 110, 112 to determine the established priorities. The router 40 can then use these various priorities represented by the databases 102, 104, 106, 108, 110, 112 for querier interface entry creation/modification as described below with respect to FIGS. 7 and 8.

Figure 7:
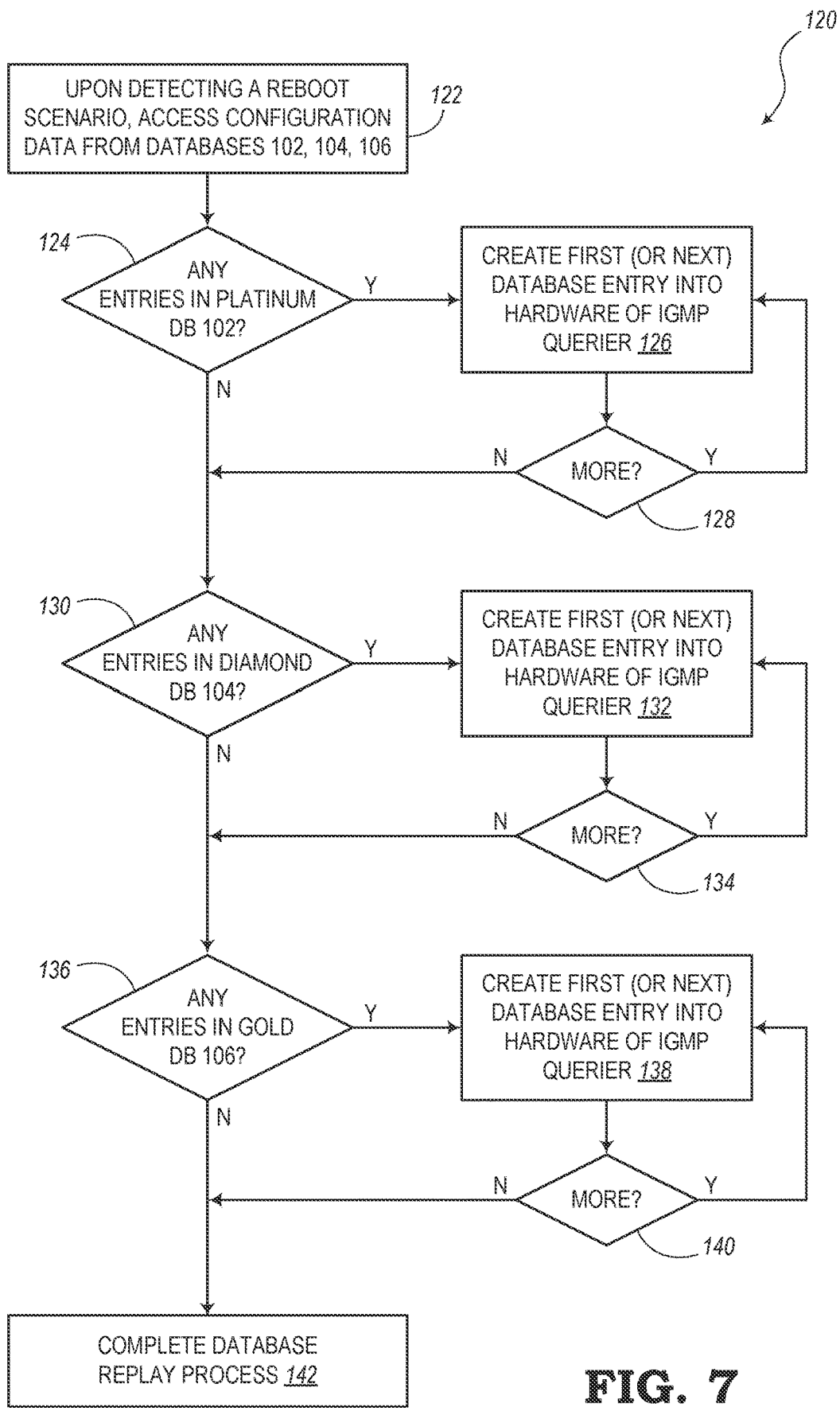
FIG. 7 is a flow diagram illustrating the entry of configuration data into the hardware of the IGMP querier device of FIG. 3 after a system reboot to prioritize the interfaces of the IGMP querier device as established in the process described with respect to FIG. 4, according to various embodiments.

FIG. 7 is a flow diagram illustrating an embodiment of a process 120 for entering configuration data into the hardware of an IGMP querier device (e.g., router 14, 40) after a system reboot. For example, the reboot may include a restarting of the router 14, 40, the IGMP snooping device (e.g., switch 16), and/or the entire VLAN 22. The process 120 is adapted to enter the configuration data into hardware in order to prioritize the interfaces 20 of the IGMP querier device or router 14 as established in the process 60 described with respect to FIG. 4.

Upon detecting a reboot scenario, the process 120 is configured to "replay" or access the configuration data from the databases 102, 104, 106 (if any) so as to use this data as needed for re-entering into hardware of the router or IGMP querier device, as indicated in block 122. The process 120 then includes the step of determining whether there are any entries present in the platinum database 102 (or highest priority database), as indicated in condition block 124. If there are no entries in this database, the process 120 skips ahead to condition block 130. However, if entries are found in this database, the process 120 proceeds to block 126, which includes the step of creating or entering a first (or next) database entry associated with the relevant configuration data into the hardware of the IGMP querier device. Then, the process 120 determines whether there are more entries in the platinum database 102, as indicated in condition block 128. If there are no more entries in this database, the process 120 proceeds to condition block 130. Otherwise, if more are found, the process 120 loops back to block 126 to create or enter the next database entry into hardware.

As indicated in condition block 130, the process 120 includes the step of determining whether there are any entries present in the diamond database 104 (or next highest priority database). If there are no entries in this database, the process 120 skips ahead to condition block 136. However, if entries are found in this database, the process 120 proceeds to block 132, which includes the step of creating or entering a first (or next) database entry associated with the relevant configuration data into the hardware of the IGMP querier device. It should be noted that this entry will follow the entries already entered with respect to the higher priority configuration data. Then, the process 120 determines whether there are more entries in the diamond database 104, as indicated in condition block 134. If there are no more entries in this database, the process 120 proceeds to condition block 136. Otherwise, if more are found, the process 120 loops back to block 132 to create or enter the next database entry into hardware.

As indicated in condition block 136, the process 120 includes the step of determining whether there are any entries present in the gold database 106 (or next highest priority database). If there are no entries in this database, the process 120 skips ahead to block 142. However, if entries are found in this database, the process 120 proceeds to block 138, which includes the step of creating or entering a first (or next) database entry associated with the relevant configuration data into the hardware of the IGMP querier device. It should be noted that this entry will follow the entries already entered with respect to the higher priority configuration data. Then, the process 120 determines whether there are more entries in the gold database 106, as indicated in condition block 140. If more are found, the process 120 loops back to block 138 to create or enter the next database entry into hardware. Otherwise, if there are no more entries in this database, the process 120 proceeds to block 142, which includes the step of completing the database replay into hardware.

Thus, the process 120 of FIG. 7 includes the IGMP querier hardware entry creation after system restart/reboot. Usually, a customer may use a dedicated querier interface per FD for streams based on service class (e.g., platinum, diamond, gold, silver, etc.) to keep a priority on a per-querier-interface level. This will ensure the fast handling of all data for the querier interfaces, including, for example, initial configuration, configuration modification, operational update, or any other static or dynamic changes on the querier interface. Querier interface priority will ensure faster delivery of GQs for priority groups which will minimize the delay in stream delivery to hosts.

There may be some advantages to having priority at a per-querier-interface level. First, faster handling of the higher-priority querier interface will ensure the faster delivery of GQs for priority streams which will enable the faster handling of "join" requests for priority streams and may result in faster delivery of priority streams. Also, it will ensure a better experience for prime users. Second, faster handling of the higher-priority querier interface will ensure the fast filtering for multicast groups. This may help to avoid unnecessary flooding of traffic with premium class streams and may also save network bandwidth and resources. In the case of limited resources on the IGMP querier device, priority will ensure that the "join" requests for premium class stream should not get dropped due to resource unavailability. In this case, the querier may decide to drop lower priority streams as needed and allow higher priority hosts to join the stream.

Figure 8:
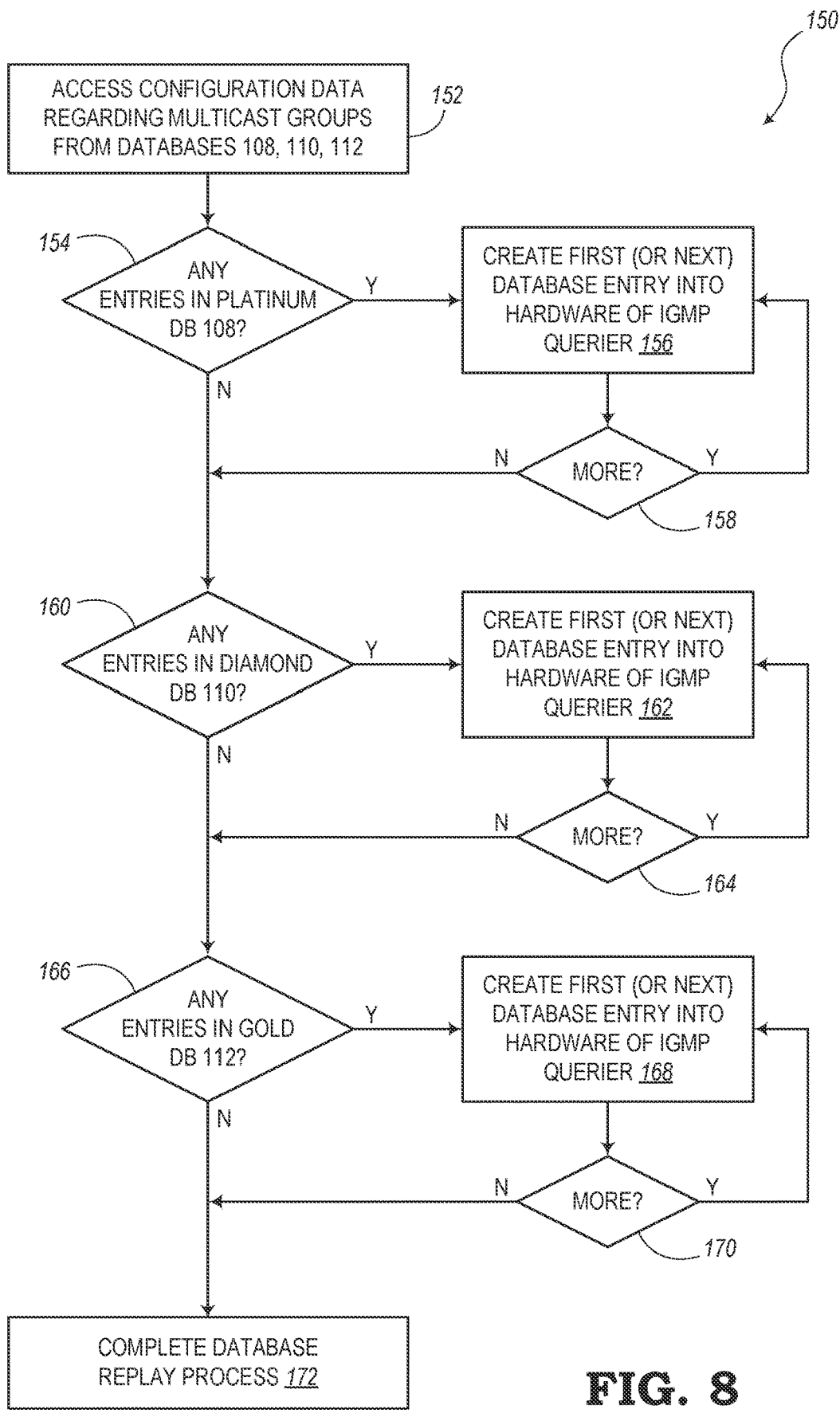
FIG. 8 is a flow diagram illustrating the entry of configuration data into the hardware of the IGMP querier device of FIG. 3 after a system reboot to prioritize multicast streams as established in the process described with respect to FIG. 5, according to various embodiments.

FIG. 8 is a flow diagram illustrating an embodiment of a process 150 for entering configuration data into the hardware of the IGMP querier device (e.g., router 14, 40) after a system reboot. Again, the reboot may include the restarting of the IGMP querier device, IGMP snooping device, and/or the entire VLAN 22. The process 150 is adapted to enter the configuration data into hardware in order to prioritize multicast streams as established in the process 80 described with respect to FIG. 5. It may be noted that blocks 152-172 of the process 150 of FIG. 8 includes similar actions with respect to block 122-142 of the process 120 of FIG. 7. However, instead of prioritizing the IGMP querier devices (e.g., routers 14) and IGMP querier device interfaces (e.g., interfaces 20), the process 150 is configured to prioritize the multicast streams of each of the IGMP querier devices or IGMP querier device interfaces. Also, instead of retrieving data from databases 102, 104, 106, the process 150 is configured to retrieve data from the respective databases 108, 110, 112.

Thus, the process 150 can use the prioritized databases 108, 110, 112 for the creation, modification, or entry of multicast group data into the hardware of the IGMP querier device. The process 150 handles the creation of multicast groups per IGMP querier.

Multicast group priority will ensure prioritized handling per querier interface for any kind of group specific operations (e.g., configurational update, operational update, etc.). Per group prioritization will ensure a faster delivery of GQs and thus enable multicast streaming much faster from a dedicated source in case of Source Specific Multicast (SSM). Having priority at per-multicast-group level for querier interface may include certain advantages. For example, faster multicast group entry creation in hardware may ensure faster delivery of GQs for prioritized streams, which may result in faster session stabilization with hosts. Also, this may enable faster application of SSM filtering. Furthermore, prioritizing per-multicast-group levels may ensure the processing of host's "join" requests in case of limited resources available on the IGMP querier device.

Thus, section I and II above relate to prioritizing with respect to IGMP querier devices, IGMP querier device interfaces, and multicast streams at the IGMP querier device level. In some embodiment, the prioritization on this querier device level may be sufficient to enforce the desired prioritization in a VLAN. Nevertheless, the following sections III and IV describe optimization on the IGMP snooping device level. That is, the IGMP snooping devices (e.g., switches 16) may also be subjected to various prioritization procedures of the present disclosure to further optimize the VLAN 22.

III. Configuring the FDs of the IGMP Snooping Device

To overcome some of the issues of the conventional system, certain "groups" (e.g., Forwarding Domains (FDs), multicast groups, host groups, etc.) at the IGMP snooping device level may also be prioritized. For example, according to some embodiments of the present disclosure, one solution may be based on this priority field, which may be a user-configured value or selection based on the using providing input on a per-FD level and/or a per-group level. Below is an example of a sample configuration:

| config# igmp-snooping instance <fd-name> igmp-snooping-config priority | | |
|---|---|---|
| class-platinum | class-diamond | class-gold |

Figure 9:
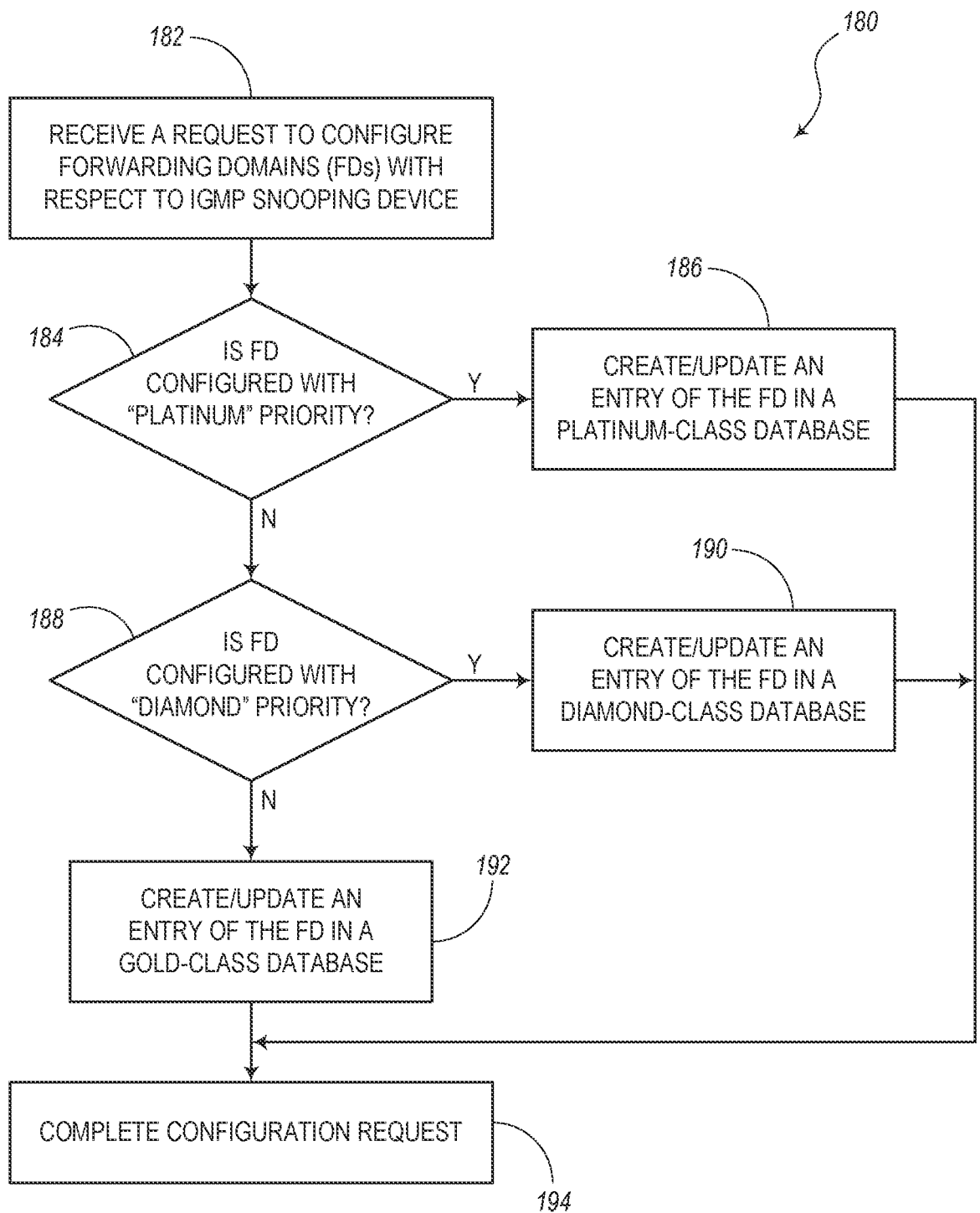
FIG. 9 is a flow diagram illustrating a process for creating a third set of databases to be used to prioritize Forwarding Domains (FDs) of the IGMP snooping device shown in FIGS. 1 and 2, according to various embodiments.

FIG. 9 is a flow diagram illustrating an embodiment of a process 180 for creating a third set of databases to be used to prioritize FDs of the IGMP snooping device (e.g., switch 16 shown in FIGS. 1 and 2). Again, the first and second sets of databases are related to the IGMP querier device interfaces and associated multicast groups. The process 180 includes blocks 182-194 that may be similar to corresponding blocks 62-74 shown in FIG. 4 and/or the corresponding blocks 82-94 shown in FIG. 5. However, instead of classifying IGMP queriers, querier interfaces, or multicast groups associated with the IGMP interfaces, the process 180 is configured to classify the FDs associated with the IGMP snooping devices (e.g., switches 16).

Figure 10:
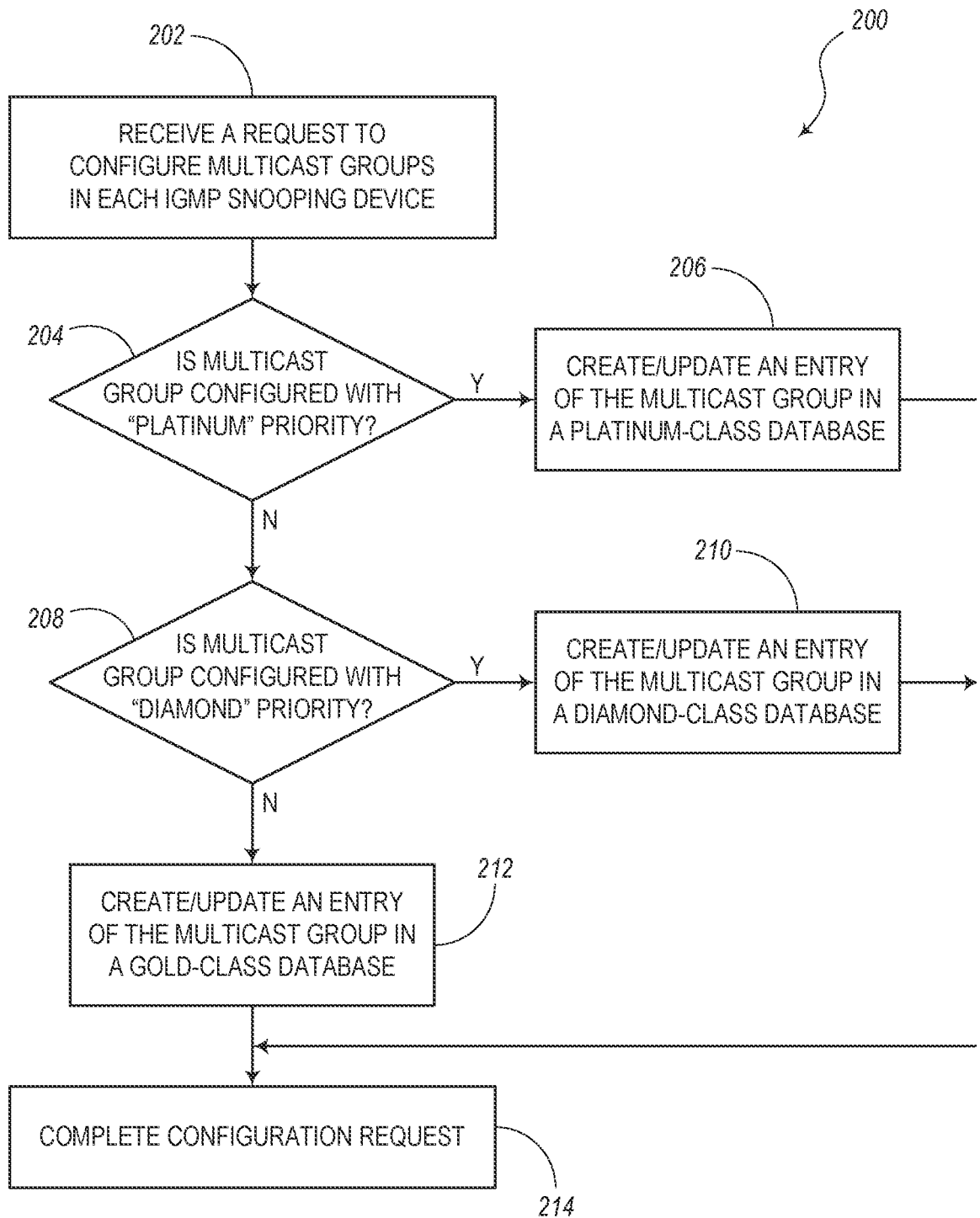
FIG. 10 is a flow diagram illustrating a process for creating a fourth set of databases to be used to prioritize multicast groups at each of the IGMP snooping device as prioritized with respect to the process of FIG. 4, according to various embodiments.

FIG. 10 is a flow diagram illustrating an embodiment of a process 200 for creating a fourth set of databases to be used to prioritize multicast groups at each of the IGMP snooping devices, which may be based on the FDs prioritized with respect to the process 180 of FIG. 9. Therefore, in addition to the FD priority process described with respect to FIG. 9, the IGMP snooping devices (e.g., switches 16) can further prioritize the multicast groups on each respective FD using a user configurable priority. The process 200 includes blocks 202-214 that may be similar to the corresponding blocks 62-74 shown in FIG. 4, the corresponding blocks 82-94 shown in FIG. 5, and/or the corresponding blocks 182-194 shown in FIG. 9. However, instead of classifying the FDs, the process 200 is configured to classify the multicast groups associated with each of the previous classified FDs. The databases may include a fourth set of databases or may be the same set as described with respect to FIG. 9. Thus, the process 200 creates multicast group databases as shown for IGMP snooping device database creation or for updating the databases described herein.

Figure 11:
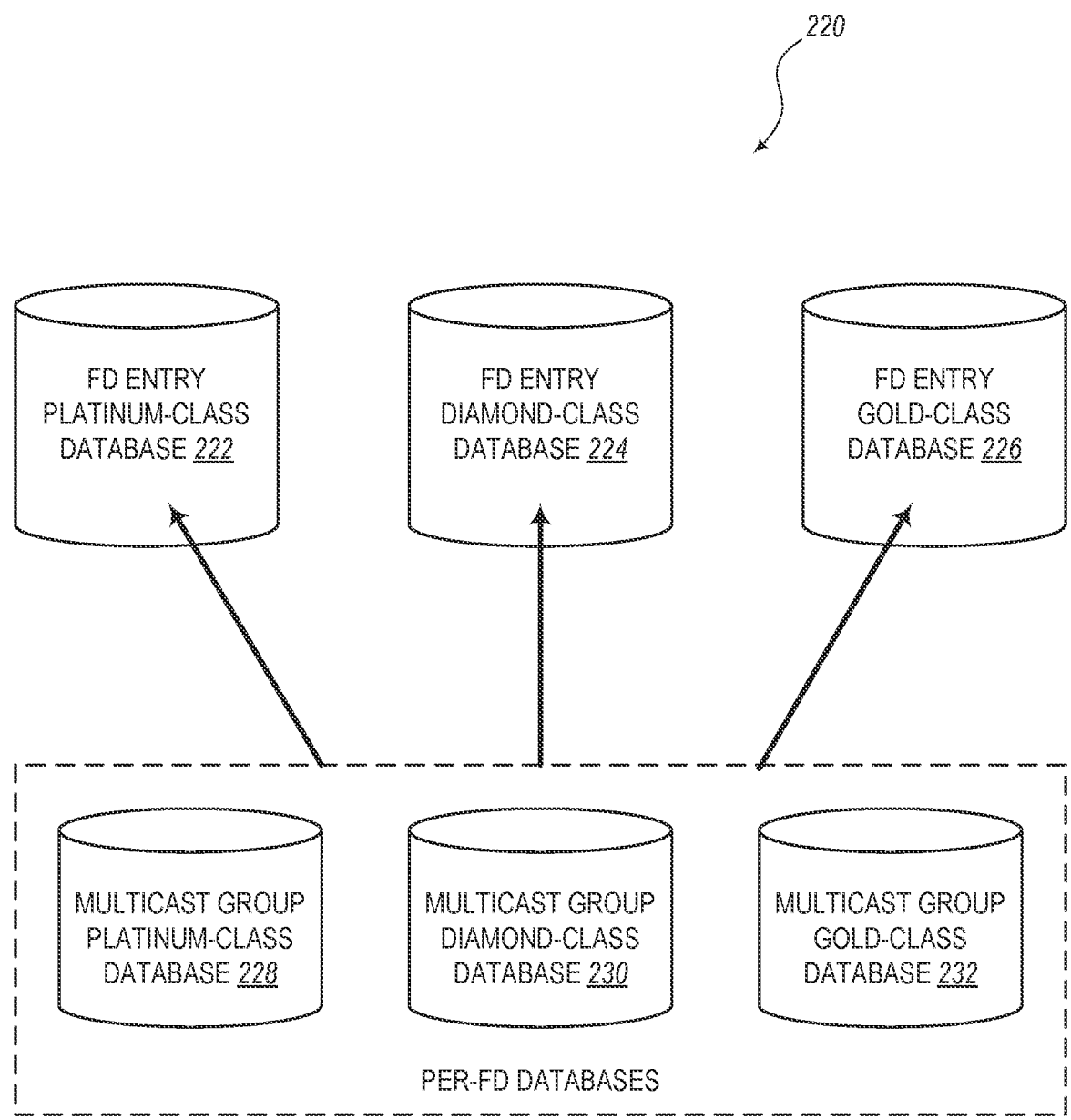
FIG. 11 is a diagram illustrating the third and fourth sets of databases described with respect to the processes of FIGS. 9 and 10, according to various embodiments.

FIG. 11 is a diagram illustrating an embodiment of a database layout 220 including the third and fourth sets of databases described with respect to the processes 180, 200 of FIGS. 9 and 10, respectively. The database layout 220 may include the FD databases 222, 224, 226, wherein database 222 corresponds to the "platinum-class" database described with respect to block 186 shown in FIG. 9, database 224 corresponds to the "diamond-class" database described with respect to block 190, and database 226 corresponds to the "gold-class" database described with respect to block 192. Each of the databases 222, 224, 226 may each be configured with an additional layer of databases 228, 230, 232, wherein each of the databases 228 corresponds to the "platinum-class" database described with respect to block 206 shown in FIG. 9, database 230 corresponds to the "diamond-class" database described with respect to block 210, and database 232 corresponds to the "gold-class" database described with respect to block 212.

Thus, the processes 180, 200 may be executed at any time before a reboot procedure to establish the priorities associated with each of the IGMP snooping devices, such as FD classifications and multicast group (e.g., host group) classifications. Thereafter, when the system is rebooted, the IGMP snooping device (e.g., switches 16) may reference the databases 222, 224, 226, 228, 230, 232 to determine the established priorities. The IGMP snooping device can then use these various priorities represented by the databases 222, 224, 226, 228, 230, 232 for snooping device entry creation/modification into hardware of the snooping devices as described below with respect to FIGS. 12 and 13.

Figure 12:
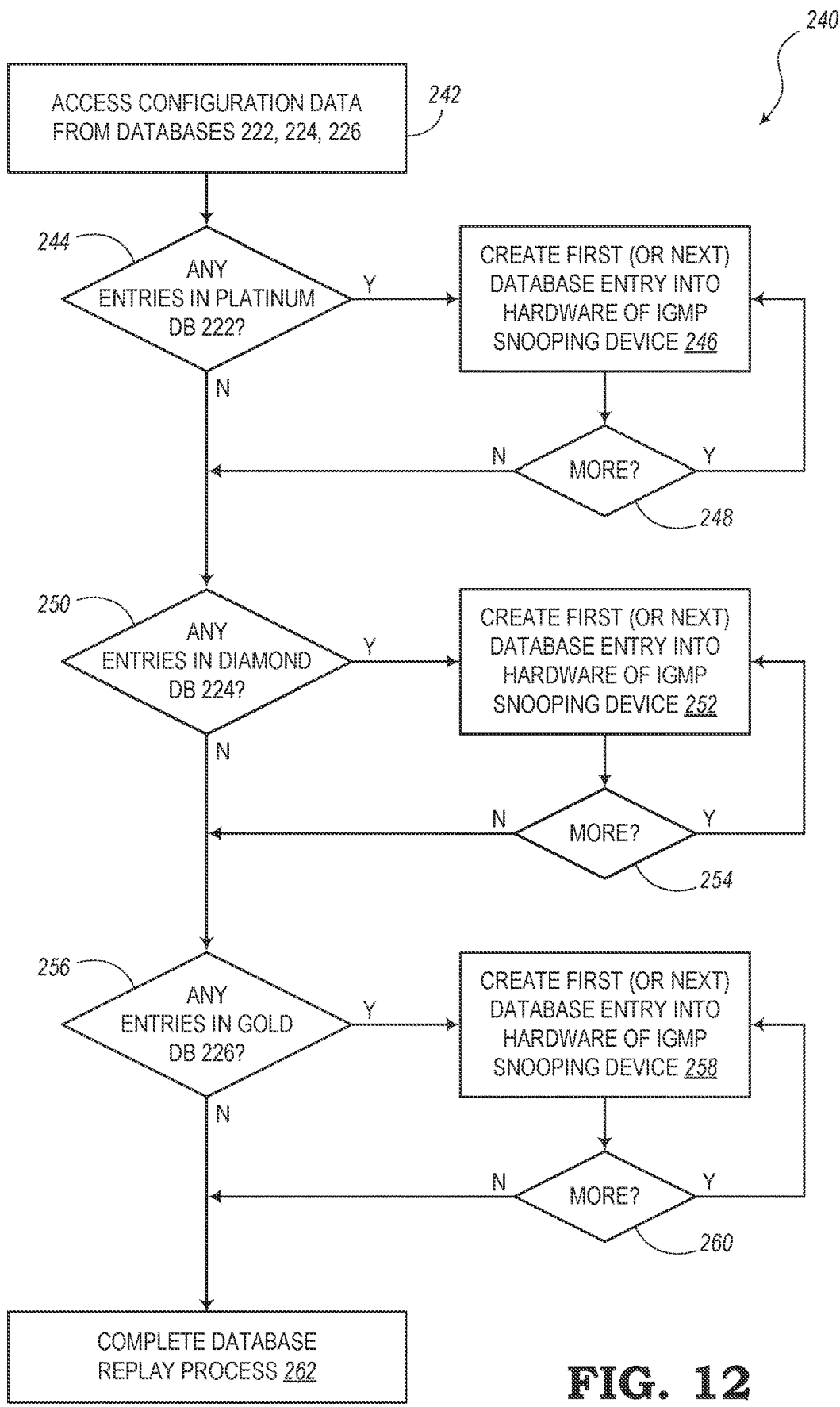
FIG. 12 is a flow diagram illustrating the entry of configuration data into the hardware of the IGMP snooping device shown in FIGS. 1 and 2 after a system reboot to prioritize the FDs as established in the process described with respect to FIG. 9, according to various embodiments.

FIG. 12 is a flow diagram illustrating an embodiment of a process 240 for entering configuration data into the hardware of the IGMP snooping devices (e.g., switch 16 shown in FIGS. 1 and 2) after a system reboot. Again, the reboot may include the restarting of the IGMP querier device, IGMP snooping device, and/or the entire VLAN 22. The process 240 may be adapted to enter the configuration data into the hardware in order to prioritize the FDs as established in the process 180 described with respect to FIG. 9. It may be noted that blocks 242-262 of the process 240 of FIG. 12 may include similar actions with respect to block 122-142 of the process 120 of FIG. 7 and/or the blocks 152-172 of the process 150 of FIG. 8. However, instead of prioritizing the IGMP querier devices, interfaces, and other parameters associated with the IGMP querier devices, the process 240 is configured to prioritize the FDs of each IGMP snooping device.

Also, the process 240 is configured to retrieve data from the databases 222, 224, 226 as established with respect to the process 180 of FIG. 9 and shown in FIG. 11. Thus, the process 240 can use the prioritized databases 222, 224, 226 for the creation, modification, and/or entry of FDs into the hardware of the IGMP snooping devices for installing the relevant configuration data therein. The process 240 handles the creation of the FDs per IGMP snooping device.

Usually, customers may use a dedicated VLAN for streams based on service class (e.g., platinum, diamond, gold, silver, etc.) so keeping a priority on a per-FD level will ensure the fast handling of the data (e.g., initial configuration, configuration modification, operational update, or any other static or dynamic changes) on the FD. The FD priority will ensure faster delivery of multicast streams with minimum impact on services.

Some advantages of having priority at the per-FD level may include the following. First, faster hardware entry creation may enable the processing of "join" requests faster and may send these toward the server 12 via the router 14 with minimum delay, which may result in faster connection stabilization between the server 12 and hosts 18, thus improving the overall user experience associated with the hosts 18. Also, this may act as a support of querier interface priority and help in faster session stabilization with hosts 18 in the embodiments in which the same device is used to act as both the IGMP querier device and IGMP snooping device.

Another advantage of per-FD level prioritization is that faster hardware entry creation may ensure the fast filtering for multicast groups. For example, this may avoid unnecessary flooding of traffic in premium class FDs. It may also save network bandwidth and resources. Also, faster hardware entry creation may minimize the exposure of premium streams to unknown hosts, which may help in reducing the threats in network security (e.g., DoS, DDoS, etc.). In the case of limited device resources, the FD level priority may ensure the entry creation for premium class FDs, such that any necessary dropping may be applied to lower priority FDs.

Figure 13:
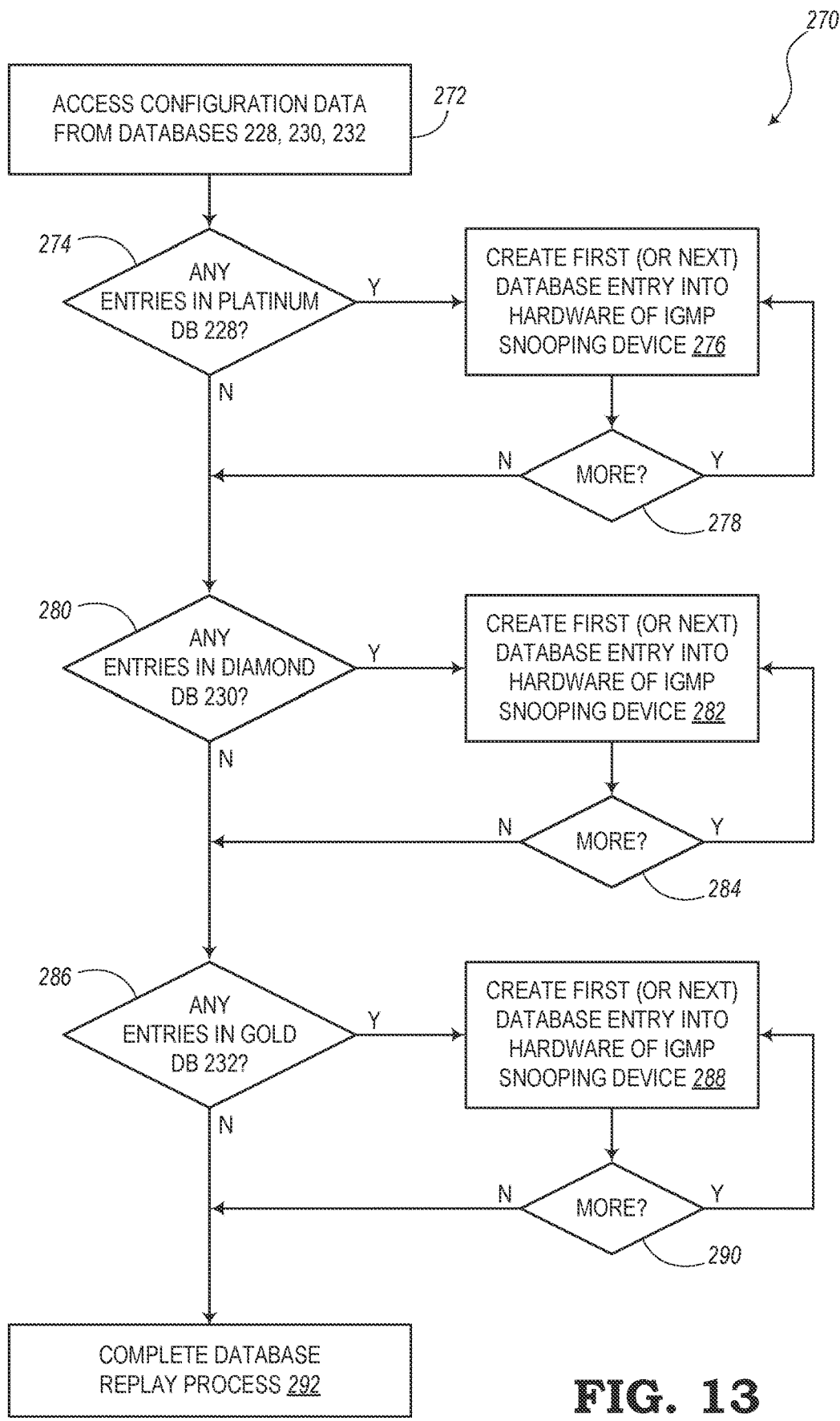
FIG. 13 is a flow diagram illustrating the entry of configuration data into the hardware of the IGMP snooping device shown in FIGS. 1 and 2 after a system reboot to prioritize multicast streams as established in the process described with respect to FIG. 10, according to various embodiments.

IV. Configuring the Priority of Multicast Streaming of the IGMP Snooping Devices FDs FIG. 13 is a flow diagram illustrating an embodiment of a process 270 for entering configuration data into the hardware of the IGMP snooping device (e.g., switches 16 shown in FIGS. 1 and 2) after a system reboot. Again, the reboot may include the restarting of the IGMP querier device, IGMP snooping device, and/or the entire VLAN 22. Also, similar to the process 240 of FIG. 12, the process 270 may operate on the IGMP snooping devices. The process 270 may be adapted to enter the configuration data into the hardware in order to prioritize multicast groups as established in the process 200 described with respect to FIG. 10. It may be noted that blocks 272-292 of the process 270 of FIG. 13 may include similar actions with respect to block 122-142 of the process 120 of FIG. 7, the blocks 152-172 of the process 150 of FIG. 8, and/or the blocks 242-262 of the process 240 of FIG. 12. However, instead of prioritizing the IGMP querier devices, querier interfaces, and FDs, the process 270 is configured to prioritize the multicast groups associated with each FD configured in FIG. 12.

Also, the process 270 is configured to retrieve data from the databases 228, 230, 232 as established with respect to the process 2000 of FIG. 10 and shown in FIG. 11. Thus, the process 270 can use the prioritized databases 228, 230, 232 for the creation, modification, and/or entry of multicast groups (e.g., host groups) into the hardware of the IGMP snooping devices for installing the relevant configuration data therein. The process 270 handles the creation of the multicast groups per FD in each of the respective IGMP snooping devices.

Furthermore, the prioritization of the groups in a FD may rely on user configurable priority input on per-multicast-group basis. Below is a sample configuration:

```
config# igmp-snooping instance <fd-name>
    group <group-address> group-config
    priority
        class-platinum       class-diamond       class-gold
```

The IGMP network 10 can use similar methods to create multicast group databases as shown for the FD database creation described above. This may result in the overall database layout 220 of FIG. 11. The process 270 can utilize the databases 228, 230, 232 in a similar way as described above for multicast group per querier interface as described in the process 150 of FIG. 8. Multicast group priority (or host group priority), in each FD, may ensure the prioritized handling of any kind of multicast group specific operation (e.g., configurational update, operational update, etc.). Per-multicast-group prioritization will ensure a faster delivery of multicast streams from a dedicated source in case of SSM.

Some advantages of having priority at per-multicast-group level in a FD are described in the following. For example, faster group entry creation in a FD will ensure faster delivery of prioritized streams. Also, this may enable faster application of SSM filtering. This may also avoid flooding of source specific streaming to other hosts results in bandwidth and resource conservation.

Figure 14:
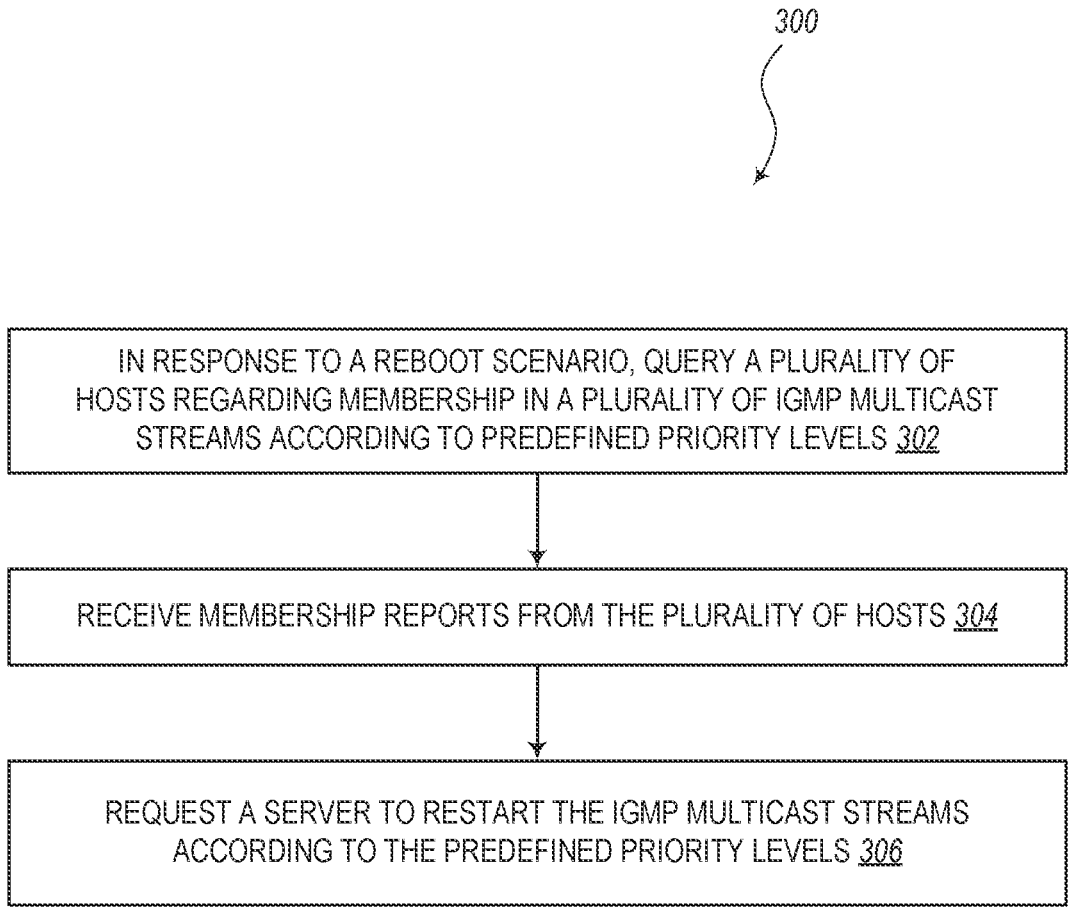
FIG. 14 is a flow diagram illustrating a general process for prioritizing multicast streams in an IGMP environment, according to various embodiments.

FIG. 14 is a flow diagram illustrating an embodiment of a process 300 for prioritizing multicast streams in an IGMP environment. In response to a reboot scenario, the process 300 includes the step of querying a plurality of hosts (e.g., hosts 18) regarding membership in a plurality of IGMP multicast streams according to predefined priority levels, as indicated in block 302. Next, the process 300 includes the step of receiving membership reports from the plurality of hosts, as indicated in block 304. The process 300 also includes the step of requesting a server (e.g., server 12) to restart the IGMP multicast streams according to the predefined priority levels, as indicated in block 306.

According to some embodiments, the process 300 may be implemented by a router (e.g., router 14) that is configured to act as an IGMP querier device. The reboot scenario may include a) a reboot of the router itself, b) a reboot of a Layer 2 (L2) switch (e.g., one of the switches 16) acting as an IGMP snooping device in the IGMP environment, and c) a reboot of a VLAN (e.g., VLAN 22) defining the IGMP environment. Each of the IGMP multicast streams may include one of a static stream and a dynamic stream. The predefined priority levels may be entered as service class priorities by a user, such as a network operator.

Furthermore, the process 300 may also include the step of recording the predefined priority levels of the IGMP multicast streams in a plurality of databases before detecting for the reboot scenario. The process 300 may further include the step of utilizing data entries in the plurality of databases to recreate configuration information in hardware of the router. The step of recreating the configuration information in the hardware of the router may be adapted to provide session stabilization after the reboot scenario. The plurality of databases may include a first set of databases associated with prioritization on an IGMP querier device level, a second set of databases associated with prioritization on a multicast group level related to the IGMP querier device, a third set of databases associated with prioritization on a Forwarding Domain (FD) level related to an IGMP snooping device, and a fourth set of databases associated with prioritization on a multicast group level related to the IGMP snooping device. The process 300 may also prioritize the IGMP multicast streams based on the predefined priority levels classifying interfaces of the IGMP querier device and prioritize the IGMP multicast streams based on the predefined priority levels classifying the multicast groups of the interfaces of the IGMP querier device. Furthermore, the process 300 may also prioritize the IGMP multicast streams based on predefined priority levels classifying FDs associated with each of a plurality of IGMP snooping devices and prioritize the IGMP multicast streams based on predefined priority levels classifying multicast groups of each of the FDs.

The step of receiving the membership reports (block 304) may include receiving one or more messages from one or more hosts to join or leave multicast groups associated with the IGMP multicast streams. The step of requesting the server to restart the IGMP multicast streams according to the predefined priority levels (block 306) may include prioritizing the IGMP multicast streams to reduce the exposure of higher-priority IGMP multicast streams to Denial of Service (DoS) attacks. The plurality of hosts, for example, may be user devices, Internet Protocol television (IPTV) devices, and/or display devices.

According to some embodiments, the FDs, in simpler terms, may refer to a Virtual Switch Instance (VSI) of a VLAN (VLAN/VSI) which has different ports, interfaces, or flow-points as members attached to them. An incoming packet on a port, interface, or flow-point may be switched to different ports using a MAC table. In the case of multicast packets with multicast MAC addresses, or if a MAC entry is not present in the MAC table, packets may be sent out to all ports, interfaces, flow-points of the same VLAN/VSI only. This is what "forwarding domain" may refer to.

A multicast group may refer to host groups and/or multicast traffic streams that particular hosts are interested in listening to (or subscribing to). Whenever a join message is received and there is no multicast group created, the router may be configured to create a new multicast group in the hardware. Also, the router may add the host to the hardware such that this host will receive the stream for consumption and no other host, even though there may be multiple flow-points in the same VLAN/VSI from which the join message came. This may essentially be considered to be a subset of VLAN/VSI that is created on the basis of IGMP packets.

The benefit of the L2 switches 16 is that not every packet is multicast to every host. That is, the multicast process is different than a broadcast process in which all hosts would receive packets. Thus, the L2 switch reduces the traffic by understanding the multicast groups. Without this IGMP snooping, the multicast streams coming from the server would eventually flood all the hosts in the network. So, by controlling the multicast groups, the switch 16 is configured to reduce a streaming scenario from a broadcast-type stream (that goes to all hosts) to a multicast-type stream (that has a defined multicast domain). Only those hosts that want the stream from that particular server will get the stream. Similarly, when an end-user is watching television using a host configured as an IPTV, for example, the end-user uses the IPTV to have it tuned to a specific channel and it does not need to receive data packets for every single channel, just the one the end-user is interested in or watching.

One of the keys of the present disclosure is to reorder the GQs 26, 28, membership reports 30, 32, and streaming requests 34 as shown in FIG. 2 from the 1 through x messages to an order that is based on the added priorities described in the present disclosure, which may not necessarily be the 1 through x order. In some respects, this reordering optimizes the higher-priority streams and allows these streams to be handled first. Then, the lower-priority streams can be processed later. This allows the user to decide the order.

The systems and methods described in the present disclosure include many points of novelty with respect to conventional IGMP systems. For example, the present disclosure allows a user to configure the priority on a per-querier-interface level and on a per-multicast-group level on the IGMP querier device. The present disclosure also allows the user to configure the priority on a per-FD level and on a per-multicast-group level on the IGMP snooping device. Before the system is detected for reboot or restart scenarios, the systems and methods are configured to create prioritized databases by entering configured data based on user-defined priorities of different multicast streams or multicast groups. Priority may be selected and recorded in the databases with respect to IGMP querier interfaces, FDs, and multicast groups. Then, after a reboot is detected, the databases can be accessed in a predefined order, based on priority, to reinstall configuration information into the hardware components of the IGMP querier device and/or IGMP snooping devices to give quicker attention to the higher-priority multicast groups. Thus, the embodiments of the present disclosure are configured to solve a real-world use case that, until now, has not been solved. During IGMP querying and snooping, it was found that conventional systems experienced issues for which the root cause was delay in hardware entry of configuration information. Therefore, the embodiments of the present disclosure are intended to help resolve potential issues in a customer's network.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A router configured in an Internet Group Management Protocol (IGMP) environment, the router comprising circuitry configured to:
   in response to a reboot scenario, query a plurality of hosts regarding membership in a plurality of IGMP multicast streams according to predefined priority levels,
   receive membership reports from the plurality of hosts, and
   request a server to restart the IGMP multicast streams according to the predefined priority levels, and
   record the predefined priority levels of the IGMP multicast streams in a plurality of databases before detecting for the reboot scenario,
   wherein the plurality of databases include a first set of databases associated with prioritization on an IGMP querier device level, and a second set of databases associated with prioritization on a multicast group level related to the IGMP querier device, and wherein the circuitry is further configured to, for the IGMP querier device,
prioritize the IGMP multicast streams based on the predefined priority levels classifying interfaces of the IGMP querier device, and
prioritize the IGMP multicast streams based on the predefined priority levels classifying the multicast groups of the interfaces of the IGMP querier device.

2. The router of claim 1, wherein the reboot scenario includes one or more of a reboot of the router itself, a reboot of a Layer 2 (L2) switch acting as an IGMP snooping device in the IGMP environment, and a reboot of a Virtual Local Area Network (VLAN) defining the IGMP environment.

3. The router of claim 1, wherein each of the IGMP multicast streams includes one of a static stream and a dynamic stream.

4. The router of claim 1, wherein the predefined priority levels are entered as service class priorities by a user.

5. The router of claim 1, wherein the circuitry is further configured to utilize data entries in the plurality of databases to at least recreate configuration information in hardware of one of the router and a layer 2 switch.

6. The router of claim 5, wherein recreating the configuration information in the hardware of the router and the layer 2 switch is adapted to provide session stabilization after the reboot scenario.

7. The router of claim 1, wherein receiving the membership reports includes receiving one or more messages from one or more hosts to join or leave multicast groups associated with the IGMP multicast streams.

8. The router of claim 1, wherein requesting the server to restart the IGMP multicast streams according to the predefined priority levels includes prioritizing the IGMP multicast streams to reduce the exposure of higher-priority IGMP multicast streams to Denial of Service (DOS) attacks.

9. The router of claim 1, wherein the plurality of hosts includes user devices, Internet Protocol television (IPTV) devices, and/or display devices.

10. A method comprising the steps of:
in response to a reboot scenario, querying a plurality of hosts regarding membership in a plurality of Internet Group Management Protocol (IGMP) multicast streams according to predefined priority levels,
receiving membership reports from the plurality of hosts,
requesting a server to restart the IGMP multicast streams according to the predefined priority levels, and
recording the predefined priority levels of the IGMP multicast streams in a plurality of databases before detecting for the reboot scenario,
wherein the plurality of databases include a first set of databases associated with prioritization on an IGMP querier device level, and a second set of databases associated with prioritization on a multicast group level related to the IGMP querier device, and wherein the steps further include, for the IGMP querier device,
prioritizing the IGMP multicast streams based on the predefined priority levels classifying interfaces of the IGMP querier device, and
prioritizing the IGMP multicast streams based on the predefined priority levels classifying the multicast groups of the interfaces of the IGMP querier device.

11. The method of claim 10, further comprising the step of recording the predefined priority levels of the IGMP multicast streams in a plurality of databases before detecting for the reboot scenario, wherein the databases are associated with an IGMP querier device configured to execute the method.

12. The method of claim 11, further comprising the step of utilizing data entries in the plurality of databases to at least recreate configuration information in hardware of a router, and a layer 2 switch wherein recreating the configuration information in the hardware of the router is adapted to provide session stabilization after the reboot scenario.

13. A router configured in an Internet Group Management Protocol (IGMP) environment, the router comprising circuitry configured to:
in response to a reboot scenario, query a plurality of hosts regarding membership in a plurality of IGMP multicast streams according to predefined priority levels,
receive membership reports from the plurality of hosts, and
request a server to restart the IGMP multicast streams according to the predefined priority levels, and
record the predefined priority levels of the IGMP multicast streams in a plurality of databases before detecting for the reboot scenario,
wherein the plurality of databases include a first set of databases associated with prioritization on a Forwarding Domain (FD) level related to an IGMP snooping device, and a second set of databases associated with prioritization on a multicast group level related to the IGMP snooping device, and wherein the circuitry is further configured to, for the IGMP snooping device,
prioritize the IGMP multicast streams based on predefined priority levels classifying FDs associated with each of a plurality of IGMP snooping devices, and
prioritize the IGMP multicast streams based on predefined priority levels classifying multicast groups of each of the FDs.

14. The router of claim 13, wherein the reboot scenario includes one or more of a reboot of the router itself, a reboot of a Layer 2 (L2) switch acting as an IGMP snooping device in the IGMP environment, and a reboot of a Virtual Local Area Network (VLAN) defining the IGMP environment.

15. The router of claim 13, wherein each of the IGMP multicast streams includes one of a static stream and a dynamic stream.

16. The router of claim 13, wherein the predefined priority levels are entered as service class priorities by a user.

17. The router of claim 13, wherein the circuitry is further configured to utilize data entries in the plurality of databases to at least recreate configuration information in hardware of one of the router and a layer 2 switch.

18. The router of claim 17, wherein recreating the configuration information in the hardware of the router and the layer 2 switch is adapted to provide session stabilization after the reboot scenario.

19. The router of claim 13, wherein receiving the membership reports includes receiving one or more messages from one or more hosts to join or leave multicast groups associated with the IGMP multicast streams.

20. The router of claim 13, wherein requesting the server to restart the IGMP multicast streams according to the predefined priority levels includes prioritizing the IGMP multicast streams to reduce the exposure of higher-priority IGMP multicast streams to Denial of Service (DOS) attacks.

* * * * *